US012045038B2

(12) United States Patent
Barth et al.

(10) Patent No.: US 12,045,038 B2
(45) Date of Patent: Jul. 23, 2024

(54) RUNTIME SERVER FOR SIMULTANEOUS EXECUTION OF A PLURALITY OF RUNTIME SYSTEMS OF AN AUTOMATION SYSTEM (71) Applicant: Beckhoff Automation GmbH, Verl (DE)

(72) Inventors: Ramon Barth, Verl (DE); Dirk Janssen, Verl (DE); Josef Papenfort, Hüllhorst (DE); Hans Beckhoff, Verl (DE)

(73) Assignee: Beckhoff Automation GmbH, Verl (DE)

( * ) Notice: Subject to any disclaimer, the term of this patent is extended or adjusted under 35 U.S.C. 154(b) by 399 days.

(21) Appl. No.: 17/558,719

(22) Filed: Dec. 22, 2021

(65) Prior Publication Data

US 2022/0113709 A1 Apr. 14, 2022

Related U.S. Application Data (63) Continuation of application No. PCT/EP2020/068413, filed on Jun. 30, 2020.

(30) Foreign Application Priority Data

Jul. 3, 2019 (DE) ...................... 10 2019 117 954.8

(51) Int. Cl.
G05B 19/418 (2006.01)
(52) U.S. Cl.
CPC . *G05B 19/41835* (2013.01); *G05B 19/41865* (2013.01); *G05B 2219/23217* (2013.01);
(Continued)
(58) Field of Classification Search
None
See application file for complete search history.

(56) References Cited

U.S. PATENT DOCUMENTS 8,321,045 B2* 11/2012 Weinrich ............... G06Q 10/04
702/83
8,984,131 B2 3/2015 Janssen et al.
(Continued)

FOREIGN PATENT DOCUMENTS

CN 101894045 A 11/2010
DE 102012012521 A1 1/2014
(Continued)

OTHER PUBLICATIONS

Santos et al., "Integrating infrastructures for manufacturing a comparative analysis." Re-engineering for Sustainable Industrial Production: Proceedings of the OE/IFIP/IEEE International Conference on Integrated and Sustainable Industrial Production Lisbon, Portugal, May 1997. Springer US, 1997. (Year: 1997).*
(Continued)

*Primary Examiner* — Carlos R Ortiz Rodriguez
(74) *Attorney, Agent, or Firm* — Dorsey & Whitney LLP (57) ABSTRACT A runtime server includes a plurality of simultaneously executing runtime systems, which are configured for real-time execution of a control program for an automation system. At least two of the runtime systems execute application modules of the control program, with at least one module executing an application of the control program being installed on each runtime system. Each runtime system has a data transmission interface for transmitting data between the runtime systems and/or application modules, an I/O configuration which defines an allocation between at least one variable of the application modules and at least one hardware address of a hardware component of the automation system, an I/O interface for data exchange between the runtime systems and hardware components, and an intermediate I/O mapping layer. The I/O configurations are mapped in the intermediate I/O mapping layer.

13 Claims, 3 Drawing Sheets (52) U.S. Cl.
CPC .............. *G05B 2219/24153* (2013.01); *G05B 2219/25369* (2013.01)

(56) References Cited

U.S. PATENT DOCUMENTS

| | | | |
|---|---|---|---|
| 9,114,528 | B2 | 8/2015 | Haag et al. |
| 10,394,212 | B2 | 8/2019 | Holler et al. |
| 2002/0147611 | A1* | 10/2002 | Greene ................ H04L 63/102 707/999.001 |
| 2007/0162906 | A1 | 7/2007 | Chandhoke |
| 2014/0074294 | A1 | 3/2014 | Wu et al. |
| 2017/0045879 | A1 | 2/2017 | Yang et al. |

FOREIGN PATENT DOCUMENTS

| | | |
|---|---|---|
| DE | 202012013193 U1 | 5/2015 |
| EP | 2546029 A2 | 1/2013 |
| EP | 2325708 B1 | 2/2014 |
| EP | 2341405 B1 | 8/2015 |
| WO | 2011061045 A1 | 5/2011 |

OTHER PUBLICATIONS

Blagojevic, Filip, et al. "Runtime scheduling of dynamic parallelism on accelerator-based multi-core systems." Parallel Computing 33.10-11 (2007): 700-719. (Year: 2007).*

Wu, Qiang, and Tilman Wolf. "On runtime management in multi-core packet processing systems." Proceedings of the 4th ACM/IEEE Symposium on Architectures for Networking and Communications Systems. 2008. (Year: 2008).*

Zabos, Attila. Temporal Partitioning of Flexible Real-time Systems. Diss. University of York, UK, 2011. (Year: 2011).*

Ghasemi, Hamid Reza, and Nam Sung Kim. "RCS: Runtime resource and core scaling for power-constrained multi-core processors ." Proceedings of the 23rd international conference on Parallel architectures and compilation. 2014. (Year: 2014).*

Barreto, Hugo. "Parallel simulation for concurrent development of manufacturing flow and its control system.", School of Industrial Engineering and Management, Department of Production Engineering (2015). (Year: 2015).*

Steinau, Sebastian. Design and implementation of a runtime environment of an object-aware process management system. Diss. Ulm University, 2015. (Year: 2015).*

Bhalachandra, Sridutt, et al. "An adaptive core-specific runtime for energy efficiency." 2017 IEEE international parallel and distributed processing symposium (IPDPS). IEEE, 2017. (Year: 2017).*

Jeong, Seongwoon, and Kincho Law. "An IoT platform for civil infrastructure monitoring." 2018 IEEE 42nd Annual Computer Software and Applications Conference (COMPSAC). vol. 1. IEEE, 2018. (Year: 2018).*

Zoitle, Alois et al. "Dynamic Reconfiguration of Distributed Control Applications with Reconfiguration Services based on IEC 61499," IEEE, 2006, 6 pages.

Goldschmidt, Thomas et al. "Software Containers for Industrial Control," 42nd Euromicro Conference on Software Engineering and Advanced Applications, 2016, IEEE, 8 pages.

Beckhoff New Automation Technology, TwinCAT 3 extended Automation (XA), Apr. 2012, 40 pages.

Office Action dated Apr. 8, 2020 in connection with German patent application No. DE 10 2019 117 954.8, 12 pages Including English translation.

International Search Report and Written Opinion dated Sep. 21, 2020 in connection with International Patent Application No. PCT/EP2020/068413, 33 pages including English translation.

International Preliminary Report on Patentability dated Oct. 22, 2021 in connection with International Patent Application No. PCT/EP2020/068413, 53 pages including English translation.

Search Report dated May 19, 2022 in connection with European patent application No. 20735570.2, 18 pages including English translation.

* cited by examiner

RUNTIME SERVER FOR SIMULTANEOUS EXECUTION OF A PLURALITY OF RUNTIME SYSTEMS OF AN AUTOMATION SYSTEM

CROSS-REFERENCE TO RELATED APPLICATIONS

This patent application is a continuation of International Patent Application No. PCT/EP2020/068413, RUNTIME SERVER FOR SIMULTANEOUSLY EXECUTING MULTIPLE RUNTIME SYSTEMS OF AN AUTOMATION INSTALLATION, filed 30 Jun. 2020, which claims priority of German patent application DE 10 2019 117 954.8, LAUFZEITSERVER ZUM GLEICHZEITIGEN AUSFÜHREN MEHRERER LAUFZEITSYSTEME EINER AUTOMATISIERUNGSANLAGE, filed 3 Jul. 2019, each of which is incorporated by reference herein, in the entirety and for all purposes.

FIELD

The present invention relates to a runtime server for simultaneously executing a plurality of runtime systems in an operating system for a data processing system for controlling an automation system. The invention further relates to a computer program product having program code for executing the runtime server and the runtime systems. The invention further relates to an automation system.

BACKGROUND

In industrial automation, programmable logic controllers (PLCs) and numerical controllers (NCs) are increasingly executed in software on powerful standard hardware, e.g. on an industrial PC. Contrary to conventional PLC/NC, which run on a stand-alone computer assembly, so-called soft PLC/NC run under the host operating system of the data processing system, e.g. Windows or Unix. For this purpose, the host operating system is extended by a real-time kernel which may also be provided by the soft PLC/NC and which controls the computing time that the host operating system supplies to the PLC/NC. A soft PLC is e.g. described in EP 2 341 405 B1.

The advantage of Soft PLC/NC compared to conventional PLC/NC is that it is largely independent of the hardware used. If necessary, the hardware may be easily exchanged or replaced by more powerful hardware. Soft PLCs/NCs thus automatically profit from the constant increase in hardware performance. In addition, the Soft-PLC/NC usually makes the user independent of the hardware supplier. In addition, changes to the process to be controlled may be implemented more easily with soft PLC/NC than with conventional PLC/NC. In a conventional PLC/NC, a special programming device is usually required to program the elements of the PLC/NC. Frequently, the PLC/NC is distributed over a plurality of computers in a computer assembly, wherein the elements of the PLC/NC are often generated by different programming languages and as a result also require different configuration tools. With the soft PLC/NC, on the other hand, the configuration tool may also be located on the same hardware as the control software.

Modular concepts are increasingly being used to reduce the time and effort involved in programming conventional and soft PLC/NC solutions for controlling or regulating complex machines and systems. Individual machine units or system assemblies or functionalities are considered as independent modules, for each of which externally encapsulated control software is created. The individual program parts may be created with different development tools or programming languages, wherein an associated compiler then translates the source code into an executable program code. These executable program modules together form the system control program. All program modules are loaded and executed at startup by an additionally provided software environment in the runtime system for real-time execution of the system control program. The individual program modules have a defined interface for communication among one another and with the software environment.

The modular structure of the PLC/NC makes it possible to develop the individual modules separately and to use the most suitable programming language or development tool required in each case. It is also possible to use standardized elements. For example, high-level languages are used as development tools for logic control, and floor diagrams or model controllers are used for control processes. However, the individual program modules are converted into an executable program with a separate computer, which is static and cannot be changed within the framework of the PLC/NC. All program modules must already be available in executable form when the PLC/NC is started up. The separate execution of the program modules additionally requires that the data exchange between the program modules takes place correctly and here in particular it must be reliably guaranteed that the data types used are compatible with one another. Since the individual program modules are completely separate from one another, data exchange must be carried out via interfaces. Furthermore, what is referred to as a linker is required for the interconnection of the program modules, which combines the program modules into a shared program. Said linker ensures that if a program module uses another program module, the addresses of the functions and variables of the module are converted into memory addresses.

Despite the advantages that may be achieved by modularizing the control program, there is still the problem that in order to carry out changes, modifications or updates to the existing control program or to individual program modules of the control program, the control program must be interrupted at least for the period in which the change or update is incorporated into the existing control program. The same applies in the event that a new program module is to be incorporated into the control program, e.g. as an extension, or an existing program module is to be removed or replaced by a new program module. However, an interruption of the control program also means an interruption of the controller and thus of the operation of the automation system each time.

Thus, a runtime server for simultaneously executing a plurality of runtime systems in an operating system for a data processing system for controlling an automation system is desirable, which allows for changes and modifications to the control program in an online state of the automation system in which the system is controlled by the control program so that changes to the control program may be carried out while ensuring operation of the automation system.

SUMMARY

The current invention provides a runtime server, a computer program product and an automation system according to the independent claims. Preferred embodiments are indicated in the dependent claims.

According to an aspect of the invention, a runtime server for simultaneously executing a plurality of runtime systems in an operating system for a data processing system for controlling an automation system based on a system control program is provided, wherein the runtime systems are configured for real-time execution of the system control program, and wherein the runtime server comprises: at least two runtime systems for executing application modules of the system control program, wherein at least one application module for executing an application of the system control program is installed on each runtime system, each runtime system having a data transmission interface for transmitting data between runtime systems and/or between application modules, wherein each runtime system comprises an I/O configuration which defines an allocation between at least one variable of the application modules of the runtime systems and at least one hardware address of a hardware component of an automation system to be controlled; an I/O interface for exchanging data between the at least two runtime systems and the hardware components of the automation system with at least one I/O input and/or I/O output; and an intermediate I/O mapping layer, wherein the I/O configurations of the at least two runtime systems are mapped in the intermediate I/O mapping layer.

This has the technical advantage that a plurality of runtime systems may be operated simultaneously by the runtime server and a plurality of application modules of the system control program may be executed on these runtime systems, so that when a change, modification or update of an application module of the system control program is to be carried out, the corresponding runtime system may be stopped in order to make the corresponding change or update, while application modules that are operated on another runtime system may continue to be executed. This ensures that the complete system control program does not have to be terminated for a change, modification or update of individual application modules of the system control program and thus the automation system may continue to be operated while the changes, modifications and updates are being carried out.

A plurality of runtime systems may be executed independently of one another on the runtime server. The runtime systems are embodied to execute at least one application module for executing an application of the system control program. Each runtime system comprises a data transmission interface by which data transmission between a plurality of runtime systems of the runtime server is possible. Furthermore, data transmission between individual application modules of the runtime systems is possible via the data transmission interface of the runtime systems. Data transmission is also possible between different application modules within a runtime system. In addition, each runtime system comprises an I/O configuration in which a unique allocation is determined between variables of the application modules installed on the respective runtime system and hardware components of the automation system to be controlled by of the system control program.

The runtime server also has an I/O interface by which data exchange between the runtime systems installed on the runtime server and the hardware components of the automation system is possible. For this purpose, the I/O interface has at least one I/O input and/or one I/O output by which a connection between the hardware components of the automation system and the respective application modules of the individual runtime systems is achieved.

The runtime server further comprises an intermediate I/O mapping layer in which the I/O configurations of the runtime systems installed on the runtime server are mapped. The intermediate I/O mapping layer thus contains all I/O configurations of the runtime systems installed on the runtime server at any one point in time. The intermediate I/O mapping layer allows for a clear allocation of the individual variables of the application modules installed on the respective runtime systems and the respective hardware components of the automation system to be controlled. The intermediate I/O mapping layer also allows for individual application modules of the system control program to be changed, modified or updated while simultaneously executing other application modules of the system control program that are not to be changed or modified at the given point in time.

For a change, modification or to perform an update of an application module of the system control program, the application module to be changed may be stopped, while the other application modules independent of the application module to be changed may continue to be operated and the system control program may thus continue to be executed at least in part.

In order to change an application module, it may be stopped and uninstalled from the respective runtime system and a corresponding changed version of the application module may be reinstalled on this runtime system. After complete installation, the modified application module may be booted and thus incorporated into the further system control program, provided that the modification made is compatible with the further system control program. Alternatively, the entire runtime system on which the application module to be modified is installed may be removed from the runtime server and a new runtime system on which the modified version of the application module to be modified is installed may be installed on the runtime server and thus the corresponding modified application module may be inserted into the system control program. Alternatively, the application module to be changed may simply be stopped and corresponding changes may be incorporated into it, and the application module thus changed may be incorporated into the existing system control program when it is started up again.

If a change to the application module to be changed provides for a change or modification of the I/O configuration, i.e. the allocation of the variables of the application module and of the hardware components of the automation system to be controlled, then, when reinstalling the changed application module in the existing system control program, the changed I/O configuration of the respective automation system is transferred to the intermediate I/O mapping layer of the runtime server so that the I/O configuration of the runtime server is updated with regard to the changes made. This updating of the I/O configuration of the runtime server by mapping the changed I/O configuration of the changed runtime system may be performed independently of the I/O configurations of the existing and unchanged runtime systems or application modules, so that the I/O configurations of the unchanged application modules or runtime systems are not affected by changes to the I/O configuration of a changed runtime system or a changed application module.

Based on the I/O configurations of the application modules that are not to be changed, which are not affected by the changes to the application modules that are to be changed, the system control program may be executed without interference during the changes made to the application modules that are to be changed and during the installation of the changed application modules. Stopping the system control program and the associated shutdown of the automation system to be controlled may be dispensed with for carrying out a change, modification or update of an application module or a plurality of application modules.

In addition to changing or modifying an existing application module that has already been entered into the system control program, the system control program may further be extended by adding a new application module that was not previously part of the system control program. For this purpose, the new application module to be added to the existing system control program may be installed on a new runtime system and the new runtime system may be integrated into the runtime server so that, when booting the newly installed application module, it is added to the existing system control program, provided that the new application module is compatible with the existing system control program.

The corresponding I/O configuration of the newly incorporated application module may be mapped into the intermediate I/O mapping layer and thus the I/O configuration of the runtime server may be updated with respect to the extension of the system control program and the newly added application module. Stopping the system control program and an associated shutdown of the automation system to be controlled is thus not necessary for extending the existing system control program by further application modules, either.

Similarly, existing application modules may be removed from the system control program without having to stop the system control program and shut down the automation system to be controlled by removing the application module to be removed from the respective runtime system or directly removing the complete runtime system with the application module installed on it from the runtime server. The corresponding change of the I/O configuration may be taken into account on the intermediate I/O mapping layer by also removing the respective I/O configuration of the removed application module or the removed runtime system from the I/O configurations of the runtime systems of the runtime server mapped to the intermediate I/O mapping layer.

The runtime server and the runtime systems are embodied for real-time execution of the system control program, which allows for real-time capable control of the automation system. The runtime server and the runtime systems installed on the runtime server, on which in turn the individual application modules of the system control program are installed and executed, allow for real-time capable and flexibly executable control of an automation plant, in which changes and modifications of the respective system control program may be carried out in an online mode of the system control program, in which the system control program is at least partially executed, so that stopping the system control program and shutting down the automation system to be controlled may be dispensed with.

In the present context, a runtime system is a runtime environment on which a computer program may be executed during a runtime. The runtime environment may be inserted into an operating system of a data processing system and ensures an execution environment for a computer program which is not supported by the respective operating system.

In the present context, an application module is an independent part of a system control program by which an application of the system control program may be executed. An application may comprise any part of the system control program. For example, an application may comprise accessing an actuator, reading a sensor or the processing of measurement data or displaying processed measurement data.

A data transmission between two application modules may in the present context comprise writing certain data into a predetermined memory area by a first application module and reading out the data stored in the memory area by the first application module with the aid of a second application module.

Each runtime system may have a management module that manages the application modules based on the control program specification. Via the management module, the application modules may switch from an inactive state, in which the application modules are not initialized and unable to execute applications, to an active state, in which the application modules may execute the respective applications. For this purpose, the application modules may have an initialization state in which the application module is inactive and from which the application module may be activated for future execution or to which the application module may be deactivated after execution is complete. Furthermore, each application module may have a pre-operational state in which the application module is activated but not yet executing any applications. In the pre-operational state, resources, particularly processor time and memory, may be allocated to the application module. In addition, each application module may have a test state in which the functionality and compatibility of the application module with the control program may be verified before the application module is executed. In an execution state, the application module is capable of executing the corresponding applications.

The application modules may be embodied to log on to the management module in the initialization state with an individual module identifier for activation or log off for deactivation. Furthermore, the application modules may establish communication connections to other application modules via the management module during the state transition from pre-operation to test operation and terminate communication connections again during the state transition from test operation to pre-operation. Furthermore, the application modules may log on to other application modules during the state transition from test mode to execution mode and log off from other application modules during the state transition from execution mode to test mode. By logging on, an interaction between the application modules can be achieved.

The application modules may thus be managed dynamically for the execution of the system control program in the runtime system. The application modules may be created, started up and executed or shut down again and switched off during runtime. Furthermore, the individual application modules may be created with different tools or different programming languages. The application modules work in the same time context and use a common memory space and common file types, so that data may be exchanged without additional linking. The standardized structure of all application modules also makes it easy to carry out changes and adjustments in the runtime system.

The application modules may allocate resources of the data processing system during the state transition from initialization to pre-operation and release allocated resources during the state transition from pre-operation to initialization. Furthermore, the application modules may save resources from other application modules during the state transition from test mode to real-time mode and return occupied resources of the other application modules during the state transition from real-time mode to test mode. This approach may achieve reliable operation of the runtime systems and effective resource management.

According to another aspect of the invention, a computer program product is provided, the computer program product comprising program code for executing the runtime server and the runtime systems, and wherein the computer program product runs on a data processing system. The computer program product can be stored on a computer-readable storage medium.

According to another aspect of the invention, an automation system having a data processing system for controlling the automation system is provided, the data processing system being implemented with at least a runtime server and at least two runtime systems and being embodied to execute a system control program implemented on the runtime systems to control the automation system.

Examples

According to an embodiment, the runtime systems are each assigned by the runtime server at least one memory area and/or one processor and/or one processor time of the data processing system.

This has the technical advantage that the runtime systems of the runtime server may be operated independently of one another. By assigning each runtime system of the runtime server its dedicated memory area and/or its dedicated processor time or its dedicated processor or processor core, the application modules of the individual runtime systems may be executed without being influenced by other application modules of other runtime systems.

If multiple processor cores are used in the data processing system, individual runtime systems may be executed on different processor cores so that different application modules may be executed simultaneously. Due to the dedicated processor time or processor core or processor assigned to each runtime system of the runtime server, individual runtime systems may easily be removed from or added to the runtime server without affecting the execution of the application modules of the other runtime systems.

According to another embodiment, the runtime systems are instantiated.

This has the technical advantage that the runtime systems of the runtime server may be operated independently of one another. Each individual runtime system is an independent runtime system in its own right. For example, the system control program may entirely be executed on a single runtime system. For this purpose, the single runtime system may comprise all application modules of the system control program and execute them according to the system control program. The installation of further runtime systems is not necessary for this.

Alternatively, a plurality of independent runtime systems may be installed on the runtime server so that, for example, only one application module of the system control program is installed on each runtime system. Data transmission between the individual application modules is possible via the data transmission interfaces of the individual runtime systems, so that the system control program comprising the application modules may be executed via the plurality of runtime systems.

The instantiation of the runtime systems allows for the modification of the application modules installed on the runtime systems or the addition and removal of runtime systems to and from the runtime server without affecting or influencing other runtime systems and the respective application modules.

According to an embodiment, the application modules are self-sufficient and independent of one another.

This achieves the technical advantage that application modules of the system control program may be changed, removed or added without affecting other application modules of the system control program. The individual application modules are self-contained subunits of the system control program and may be changed, modified, added or removed as self-contained units without having to make adjustments to the other application modules of the system control program.

This achieves a higher flexibility of the system control program. Furthermore, individual application modules may be created independently of one another, thus achieving higher programming efficiency. In addition, the modularization of the system control program facilitates error identification, as an error analysis may be limited to individual application modules of the system control program.

According to another embodiment, the runtime systems may be operated in a real-time mode and/or in a non-real-time mode.

This has the technical advantage that a range of application of the runtime server may be increased. As the runtime systems of the runtime server may be operated in a real-time mode and/or in a non-real-time mode, real-time capable or non-real-time capable application modules of the system control program may be executed on the respective runtime systems. This means that the system control program may execute different applications that meet different requirements for real-time capability.

According to an embodiment, the runtime server further comprises at least one further runtime system, wherein at least one further application module for executing an application of the system control program is installed on the further runtime system, wherein the further runtime system comprises a data transmission interface for transmitting data between the further runtime system and the runtime systems and/or between the further application module and the application modules, and wherein the further application module is not real-time capable and the further runtime system may be operated in a non-real-time mode.

This has the technical advantage that, in turn, higher flexibility of the runtime server is achieved. Additional applications of the system control program may be executed by the further runtime systems on which further application modules are installed. The further runtime systems may be operated exclusively in a non-real-time mode and the additional application modules installed on the further runtime systems are embodied exclusively for executing applications of the system control program for which real-time capability is not required.

Such applications may e.g. comprise the evaluation of measurement data or the graphical display of evaluated measurement data. By allocating the real-time capable application to the real-time capable runtime systems and the non-real-time capable application to the non-real-time capable runtime systems, an improved structuring of the runtime server and the real-time capable and non-real-time capable runtime systems installed on it is possible. This, in turn, achieves a simpler allocation of memory space or processor time or processor cores of the individual runtime systems of the runtime server.

According to another embodiment, the runtime server establishes a hierarchy among the runtime systems and/or the further runtime systems in which prioritization of runtime systems operating in real-time mode over runtime systems and/or further runtime systems operating in non-real-time mode is ensured.

This provides the technical advantage of meeting demands to real-time capable applications. The hierarchy among the runtime systems ensures that applications that are subject to compliance with a real-time requirement are prioritized over applications that are not subject to real-time requirements, so that an execution of real-time applications is not interrupted by an execution of non-real-time applications. The hierarchy within the runtime server may thus achieve real-time capability requirements for the respective runtime systems.

According to an embodiment, the runtime server further comprises a data transmission router for connecting to the data transmission interfaces of the runtime systems and the further runtime systems, wherein data exchange between runtime systems and/or further runtime systems and/or between application modules and/or further application modules is enabled via the data transmission router.

This has the technical advantage that fast, interference-resistant and reliable data transmission is achieved between runtime systems of the runtime server and application modules of the runtime systems. Data exchange between runtime systems or application modules may include the storage of data in a memory area by a first runtime system or application module and the reading out of the stored data by a second runtime system or application module.

A data exchange or a data transmission between runtime systems and/or application modules may comprise a data communication between the runtime systems and/or application modules. In addition to the transmission of data, a data communication includes a transmission of information having an information content that is understood by both communication partners.

In this regard, the data transmission router may include a script or protocol for writing data to a predetermined memory area and reading out data stored in the predetermined memory area. The data transmission router may allow for data to be transmitted between different runtime systems. The data transmission router may further allow for data to be transmitted between application modules each installed on different runtime systems. The data transmission router may further enable data transmission between different application modules installed on the same runtime system.

According to an embodiment, at least one runtime system may be added and/or removed in an online state of the controller in which at least one runtime system is executed.

This has the technical advantage that the system control program may be flexibly modified, extended or reduced. In order to expand the system control program with further applications or further application modules, a runtime system or a plurality of runtime systems on which the application modules to be extended are installed may be entered into the server.

The further runtime systems already installed on the runtime server may continue to be operated in the meantime, so that the application modules installed on these runtime systems may continue to be executed and the automation system may thus continue to be operated via the system control program. After installation of the additional runtime systems, the application modules installed on them may be started and inserted into the existing system control program, provided that they are compatible with the existing system control program.

The respective I/O configurations of the additional runtime systems may be mapped to the intermediate I/O mapping layer of the runtime server, so that the I/O configuration of the runtime server that correspond to the I/O configurations of the respective runtime systems of the runtime server mapped in the intermediate I/O mapping layer may be updated according to the changes.

Similarly, an existing runtime system or a plurality of existing runtime systems may be removed from the runtime server, while at the same time further application modules installed on further runtime systems of the runtime server may be executed and thus the automation system may be operated by the system control program. A corresponding update of the I/O configuration of the runtime server may be achieved by a corresponding mapping of the I/O configurations of the individual runtime systems to the I/O mapping layer. This provides a high degree of flexibility by allowing extensions or reductions of the system control program by additional or existing applications of the system control program during simultaneous execution of the system control program.

According to another embodiment, each of the runtime systems is executed on a separate core or on multiple cores of the processor, wherein multiple runtime systems are executed on one core or on multiple cores.

This has the technical advantage that the runtime systems of the runtime server may be operated independently of one another. This allows for a high degree of flexibility. For example, a plurality of runtime systems may be executed on one processor. This means that the runtime server according to the invention may be executed on a data processing system comprising only one processor.

In addition, each runtime system of the runtime server may be executed on its dedicated processor or processor core. This means that application modules of different runtime systems may be executed simultaneously. It is also possible to prevent the execution of application modules of individual runtime systems from being influenced by the execution of application modules of other runtime systems. In addition, individual runtime systems may be executed on a plurality of processors or processor cores. This in turn may achieve an increased degree of flexibility of the runtime server.

According to an embodiment, the runtime server may be integrated into and executed in a non-real-time operating system as a real-time environment.

This achieves the technical advantage that computer programs, in particular system control programs that have to meet real-time requirements may be executed via the runtime server and the runtime systems installed on the runtime server. This may in particular be achieved in a non-real-time operating system, e.g. commercially available operating systems for personal computers (PCs). Thus, a real-time capable system control program may be executed within a non-real-time capable operating system via the runtime server and the runtime systems installed thereon.

The embodiments described above may be used individually or in any combination with one another.

BRIEF DESCRIPTION OF THE DRAWINGS

The invention is explained in more detail with reference to the accompanying figures, in which.

DETAILED DESCRIPTION

Figure 1:
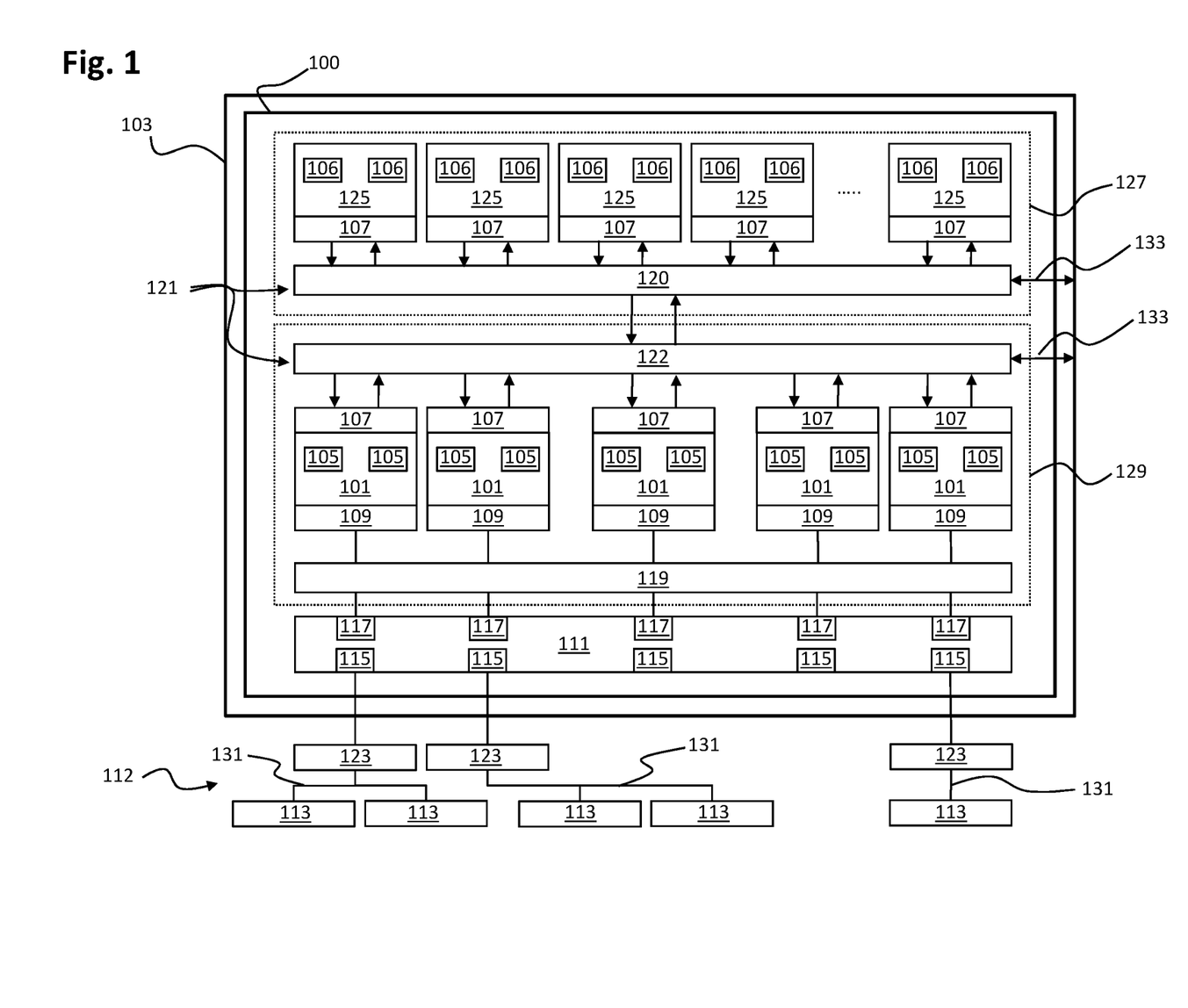
FIG. 1 shows a schematic depiction of a runtime server according to an embodiment.

FIG. 1 shows a schematic diagram of a runtime server 100 according to an embodiment.

According to the embodiment in FIG. 1, the runtime server 100 is embodied to simultaneously execute a plurality of runtime systems 101 in an operating system 103 for a data processing system for controlling an automation system 112 based on a system control program. The runtime systems 101 are embodied to execute the system control program in real time. The runtime server 100 comprises: at least two runtime systems 101 for executing application modules 105 of the system control program, wherein at least one application module 105 for executing an application of the system control program is installed on each runtime system 101, each runtime system 101 comprising a data transmission interface 107 for transmitting data between runtime systems 101 and/or between application modules 105, each runtime system 101 having an I/O configuration 109 which defines an allocation between at least one variable of the application modules 105 of the runtime systems 101 and at least one hardware address of a hardware component 113 of an automation system 112 to be controlled, an I/O interface 111 for exchanging between the at least two runtime systems 101 and the hardware components 113 of the automation system 112 having at least one I/O input 115 and/or one I/O output 117, and an intermediate I/O mapping layer 119, wherein I/O configurations 109 of the at least two runtime systems 101 are mapped in the intermediate I/O mapping layer 119.

In the embodiment of FIG. 1, the runtime server 100 is embedded in the operating system 103. Five runtime systems 101 are installed on the runtime server 100, on each of which two application modules 105 are installed. Each of the runtime systems 101 comprises a data transmission interface 107 for transmitting data and an I/O configuration 109. Each I/O configuration 109 of each runtime system 101 establishes a direct allocation of variables of the respective application modules 105 installed on the runtime system 101 and hardware components 113 of the automation system 112 to be controlled.

The runtime server 100 further comprises the intermediate I/O mapping layer 119. Each I/O configuration 109 of each runtime system 101 is mapped to the intermediate I/O mapping layer 119. For the embodiment shown in FIG. 1, the intermediate I/O mapping layer 119 includes five images of the five I/O configurations 109 of the five runtime systems 101.

The number of runtime systems 101 installed on the runtime server 100 may differ from the number shown in FIG. 1 and may have any value. For example, the runtime server 100 may be executed with only one runtime system 101 installed. Moreover, the number of two application modules 105 per runtime system 101 shown in FIG. 1 is merely exemplary. Thus, alternatively, each runtime system 101 may include any number of application modules 105 or each runtime system 101 may include only one application module 105.

The runtime server 100 moreover includes five further runtime systems 125, each of which has two further application modules 106 installed thereon. Each of the five further runtime systems 125 comprises a data transmission interface 107. The further runtime systems 125 are operated in a non-real-time mode 127, and the further application modules 106 comprise applications that satisfy non-real-time requirements.

According to the embodiment shown in FIG. 1, the five runtime systems 101 are operated in a real-time time mode 129, and the application modules 105 installed on the runtime systems 101 are embodied to execute applications according to a real-time request.

According to the embodiment shown in FIG. 1, the runtime systems 101 operated in a real-time mode 129 and the further runtime systems 125 operating in a non-real-time mode 127 are arranged in a corresponding hierarchy shown by the two dashed boxes in FIG. 1. The hierarchy of the runtime systems 101 and of the further runtime systems 125 defined on the runtime server 100 ensures real-time execution of the application modules 105 of the runtime systems 101 and prevents interference of the execution of the application modules 105 by executing the further application modules 106 of the further runtime systems 125 operated in the non-real-time mode 127.

The runtime server 100 further comprises a data transmission router 121 that may be connected to the data transmission interfaces 107 of the runtime systems 101 and of the further runtime systems 125 and allows for data transmission between runtime systems 101 with one another, between runtime systems 101 and further runtime systems 125, or between further runtime systems 125 with one another. Data transmission between application modules 105 and further application modules 106 is also enabled via the data transmission interface 107 of the respective runtime systems 101 and of the further runtime systems 125 and the data transmission router 121.

In the embodiment shown in FIG. 1, the data communication router 121 is divided up into two strings or strands, the first string or strand 120 of which allows for direct data communication between the further runtime systems 125 and the second string or strand 122 of which allows for direct data communication between the runtime systems 101. By dividing up the data communications router into the first and second strands 120, 122, the hierarchy of the runtime systems 101 and of the further runtime systems 125 is provided. By allowing the runtime systems 101 to exchange data with one another directly via the second strand 122 of the data communications router 121. Prioritization over the other runtime systems may be achieved herein and possible collisions in the data exchange may be avoided. The data exchange between the runtime systems 101 via the second strand 122 of the data communication router 121 may thus meet the real-time demands.

The further runtime systems 125 may, however, exchange data directly with one another via the first string or strand 120 of the data transmission router 121 without interference. No real-time conditions are fulfilled for the data transmission between the other runtime systems 125 via the first string 120 of the data transmission router 121.

The arrows between the two strands of the data transmission router 121 indicate that data transmission between the runtime systems 101 and the further runtime systems 125 is additionally enabled via the two strands 120, 122 of the data transmission router 121.

Furthermore, the runtime server 100 has a communication interface 133 that allows for a connection between the data transmission router 121 and the operating system 103. The communication interface 133 allow for data to be transmitted between the runtime server 100 and the operating system 103 in which the runtime server 100 is embedded is enabled.

In the embodiment shown in FIG. 1, the communication interface 133 is connected to both the first strand 120 of the data communication router 121 and the second strand 122 of the data communication router 121. Thus, again, a hierarchically ordered transmission of data may be achieved for the transmission of data between the runtime systems 101 and the further runtime systems 125 and the operating system 103, in that data may be transmitted between the runtime systems 101 and the operating system 103 via the second strand 122 of the data communication router 121, and between the further runtime systems 125 and the operating system 103 via the first strand 122 of the data communication router 121.

The runtime server 100 further comprises an I/O interface 111 having a plurality of I/O inputs 115 and I/O outputs 117. The I/O outputs 117 and the I/O inputs 115 enable a connection between the hardware components 113 of the automation system 112 and the application modules 105 of the runtime systems 101. With the intermediate I/O mapping layer 119, a unique allocation between variables of the application modules 105 and the hardware components 113 of the automation system 112 is provided. The number of I/O inputs 115 and I/O outputs 117 in the embodiment in FIG. 1 is merely exemplary and may vary according to the automation system 112 to be controlled.

According to the embodiment in FIG. 1, the automation system 112 comprises a plurality of hardware components 113. The hardware components 113 may e.g. comprise field-bus terminals or sensors or actuators of an automation system. The hardware components 113 are each connected to a bus master 123 via a data bus 131. The data bus 131 may be operated by a common fieldbus protocol. The bus masters 123 are each connected to the runtime server 100 via an I/O input 115 of the I/O interface 111. Control of the hardware components 113 of the automation system 112 may be effected by executing of the application modules 105 installed on the runtime systems 101. In this regard, the bus masters 123 may cause a data transmission between the control system of the automation system 112 and the respective hardware components 113.

The embodiment shown in FIG. 1, each having three bus masters 123 and a total of five hardware components 113, is merely exemplary and the present invention is not intended to be limited thereto.

The application modules 105 of the runtime systems 101, which are operated in real-time time mode 129, are used to execute applications of the system control program that must meet real-time demands. These may e.g. include controlling actuators of the automation system 112 or reading sensors of the automation system 112. In contrast, the further application modules 106 of the further runtime systems 125, which are operated in non-real-time mode 127, are used to execute applications of the system control program that do not have to meet real-time demands. These applications may e.g. comprise an evaluation of measurement data, a graphical display of evaluated measurement data or similar applications which have a subordinate priority for a real-time capable control of the automation system 112.

According to the embodiment shown in FIG. 1, the runtime systems 101 are instantiated and may be operated completely independently of other runtime systems 101. The application modules 105 installed on the runtime systems 101 are independent units of the system control program and are executable independently of each other. The further runtime systems 125 are also instantiated and represent independently operable units that are operable independently of the other runtime systems 101 and/or other further runtime systems 125. The further application modules 106 are also independently operable units of the system control program and may be executed independently of one another.

According to the embodiment shown in FIG. 1, runtime systems 101 and/or further runtime systems 125 may be added to the runtime systems 101 and/or further runtime systems 125 already installed on the runtime server 100. Likewise, runtime systems 101 and/or further runtime systems 125 may be removed from the runtime server 100. The remaining runtime systems 101 and/or the remaining further runtime systems 125 may continue to operate while runtime systems 101 and/or further runtime systems 125 are added or removed, and the application modules 105 and/or further application modules 106 installed thereon may continue to execute so that the automation system 112 may continue to be operated via the system control program.

Furthermore, the application modules 105 installed on the runtime systems 101 and/or the further application modules 106 installed on the further runtime systems 125 may be changed and/or modified. The application modules 105 and/or further application modules 106 that are not to be changed or modified may continue to execute while application modules 105 and/or further application modules 106 that are to be changed are being modified.

To change the application modules 105 and/or further application modules 106 to be changed, these may be stopped and the corresponding changes may be entered. When the changed application modules 105 and/or changed further application modules 106 are started up again, they may be entered into the existing system control program. Alternatively, the application modules 105 and/or further application modules 106 to be changed may be uninstalled from the respective runtime systems 101 and/or further runtime systems 125 and a changed version of the application modules 105 and/or of the further application modules 106 to be changed may be installed on the respective runtime systems 101 and/or further runtime systems 125. When the modified application modules 105 and/or further application modules 106 are started up, these may be incorporated into the existing system control program.

In the event of a change to the application modules 105 of the runtime systems 101, which includes a change to the I/O configurations 109 of the respective runtime systems 101, the respective changes to the I/O configurations 109 may be taken into account by a mapping of the changed I/O configurations 109 to the intermediate I/O mapping layer 119. Via the intermediate I/O mapping layer 119, a unique allocation of the variables of the individual application modules 105 of the runtime systems 101 to the hardware components 113 of the automation system 112 to be controlled is provided for the runtime server 100.

The runtime server 100 thus has a variable I/O configuration with the intermediate I/O mapping layer 119, which may be changed during ongoing execution of the system control program. The intermediate I/O mapping layer 119 comprises all mappings of the I/O configurations 109 of the runtime systems 101 installed on the runtime server 100. Individual I/O configurations 109 of individual runtime systems 101 may be changed in this context and the corresponding mappings of the changed I/O configurations 109 may be mapped to the intermediate I/O mapping layer 119, while other runtime systems 101 and the application modules 105 installed thereon continue to be executed.

Figure 2:
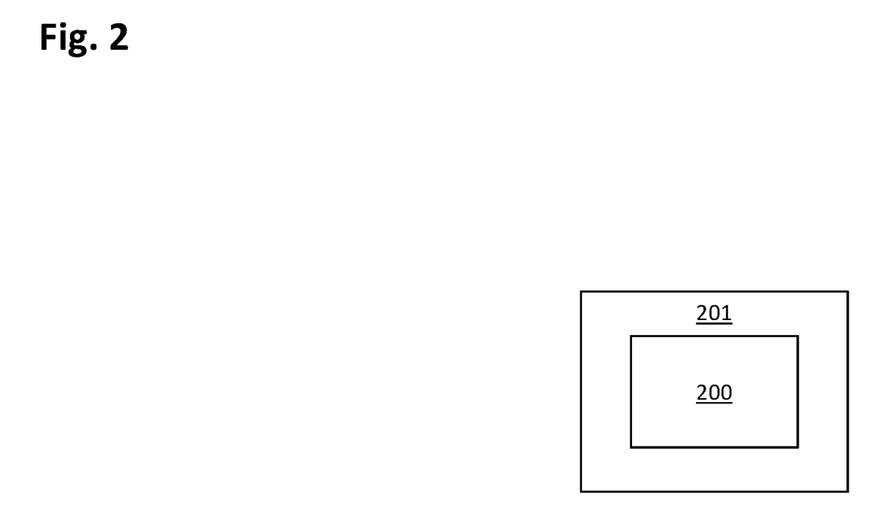
FIG. 2 shows a schematic depiction of a computer program product for executing the runtime server according to an embodiment.

FIG. 2 shows a schematic diagram of a computer program product 200 for executing the runtime server 100 according to an embodiment.

In the embodiment shown in FIG. 2, the computer program 200 is arranged on a recording medium 201.

Figure 3:
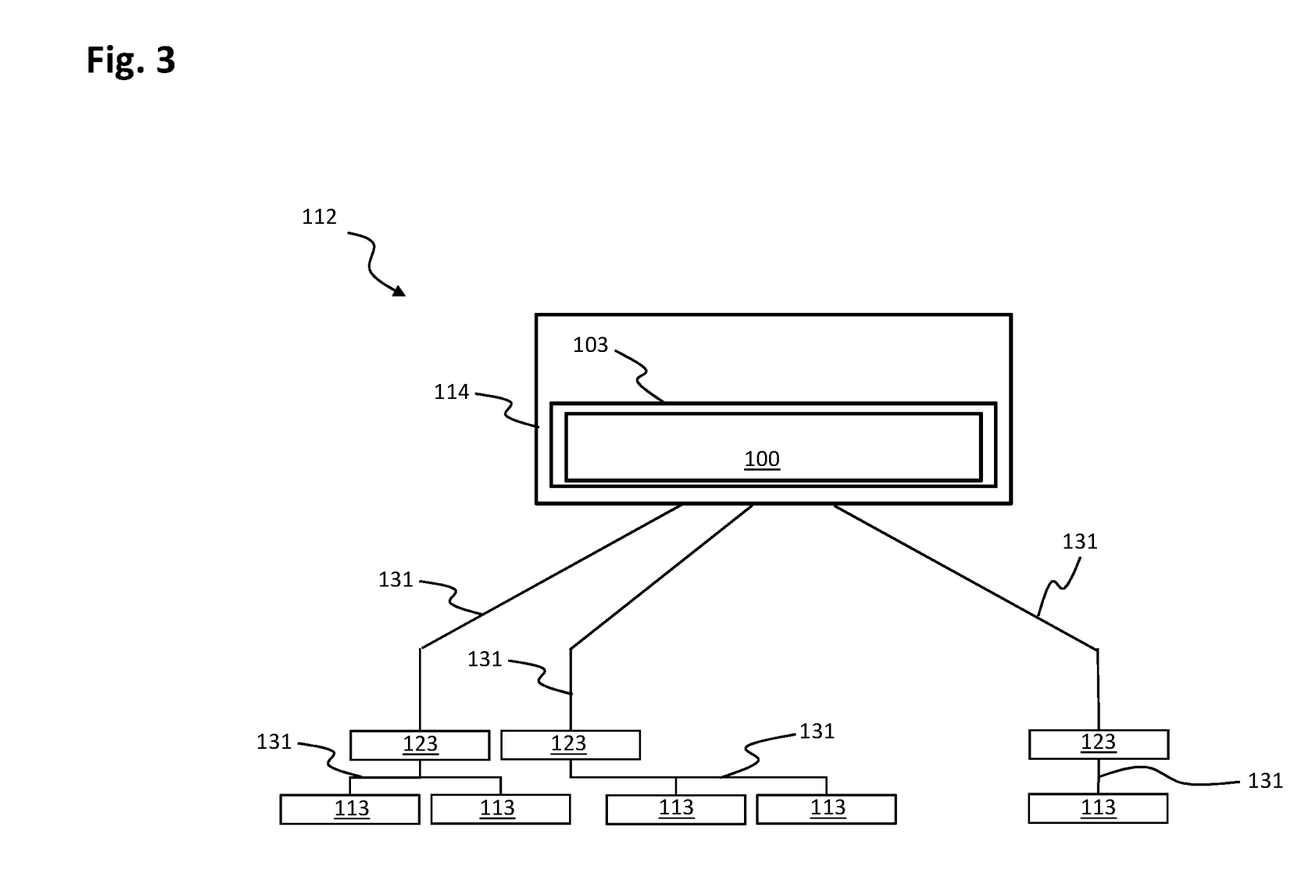
FIG. 3 shows a schematic depiction of an automation system with a data processing system for running the runtime server according to one embodiment.

FIG. 3 shows a schematic diagram of an automation system 112 having a data processing system 114 for running the runtime server 100 according to another embodiment.

In the embodiment shown in FIG. 3, the automation system 112 includes a data processing system 114 and a plurality of hardware components 113 connected to the data processing system 112 via a data bus 131.

An operating system 103 is formed on the data processing system 114 for executing the data processing system 114. A runtime server 100 is formed on the operating system 103 for executing a system control program for controlling the automation system.

The runtime server 100 as well as the operating system 103, the hardware components 113, and the data bus 131 have the features indicated for FIG. 1.

Although the invention has been further illustrated and described in detail by embodiments, the invention is not limited by the disclosed examples and other variations may be derived therefrom by those skilled in the art without departing from the scope of protection of the invention.

TABLE 1

List of Reference Numerals

| 100 runtime server |
| 101 runtime system |
| 103 operating system |
| 105 application module |
| 106 further application module |
| 107 data transmission interface |
| 109 I/O configuration |
| 111 I/O interface |
| 112 automation system |
| 113 hardware component |
| 114 data processing system |
| 115 I/O input |
| 117 I/O output |
| 119 intermediate I/O mapping interlayer |
| 120 first string |
| 121 data transmission router |
| 122 second string |
| 123 bus master |
| 125 further runtime system |
| 127 non-real time mode |
| 129 real time mode |
| 131 data bus |
| 133 communication interface |
| 200 computer program product |
| 201 recording medium |

The invention claimed is:

1. A runtime server for simultaneously executing a plurality of runtime systems in an operating system for a data processing system for controlling an automation system based on a system control program, wherein the runtime systems are configured for real-time execution of the system control program, comprising:

at least two runtime systems for executing application modules of the system control program, the runtime systems being configured as runtime environments, at least one application module for executing an application of the system control program being installed on each runtime system, each runtime system comprising a data transmission interface for transmitting data between runtime systems and/or between application modules, an individual I/O configuration being defined in each runtime system, wherein the I/O configuration defines an allocation between at least one variable of the application modules of the respective runtime system and at least one hardware address of a hardware component of an automation system to be controlled;

an I/O interface for exchanging data between the at least two runtime systems and the hardware components of the automation system with at least one I/O input and/or I/O output; and an intermediate I/O mapping layer, wherein the I/O configurations of the at least two runtime systems are mapped in the intermediate I/O mapping layer, wherein the intermediate I/O mapping layer represents an I/O configuration of the runtime server and defines an unique allocation of the variable of the application modules of the runtime systems and of the hardware components of the automation system, and wherein a data connection between the runtime systems and the I/O interface is defined via the intermediate I/O mapping layer.

2. The runtime server according to claim 1, wherein at least one memory area and/or one processor and/or one processor time of the data processing system is allocated to each of the runtime systems by the runtime server.

3. The runtime server according to claim 1, wherein the runtime systems are instantiated.

4. The runtime server according to claim 1, wherein the application modules care configured to be executed independently of one another.

5. The runtime server according to claim 1, wherein the runtime systems are operable in a real-time mode.

6. The runtime server according to claim 1, further comprising at least one further runtime system, wherein at least one further application module for executing an application of the system control program is installed on the further runtime system, wherein the further runtime system comprises a data transmission interface for transmitting data between the further runtime system and the runtime systems and/or between the further application module and the application modules, and wherein the further application module is not real-time capable and the further runtime system is configured to be operated in a non-real-time mode.

7. The runtime server according to claim 6, wherein the runtime server establishes a hierarchy among the runtime systems and/or the further runtime systems, in which a prioritization of runtime systems that are operated in real-time mode is ensured with respect to runtime systems and/or further runtime systems that are operated in non-real-time mode.

8. The runtime server according to claim 1, further comprising a data transmission router for connecting to the data transmission interfaces of the runtime systems and the further runtime systems, wherein data exchange between runtime systems and/or of further runtime systems and/or between application modules and/or further application modules is enabled via the data transmission router.

9. The runtime server according to claim 1, wherein in an online state of the controller, in which the automation system is controlled by the control program and at least one runtime system is executed, at least one runtime system is configured to be added and/or removed.

10. The runtime server according to claim 1, wherein each of the runtime systems is executed on a dedicated core or on a plurality of cores of the processor, and wherein a plurality of runtime systems is executed on one core.

11. The runtime server according to claim 1, wherein the runtime server is integrated into and executed in a non-real-time operating system as a real-time environment.

12. A non-transitory, computer-readable data storage medium having computer program stored thereon, the computer program code being executable on a data processing system for executing a runtime server and runtime systems according to claim 1.

13. An automation system comprising a data processing system for controlling a automation system, the data processing system being configured with at least one runtime server and at least two runtime systems according to claim 1, and further being configured to execute the system control program being installed on each of the runtime systems in order to control the automation system.

* * * * *